Dec. 17, 1940.          J. A. BOYER ET AL          2,225,152
                     HARD CARBIDE COMPOSITION
                      Filed Feb. 21, 1938
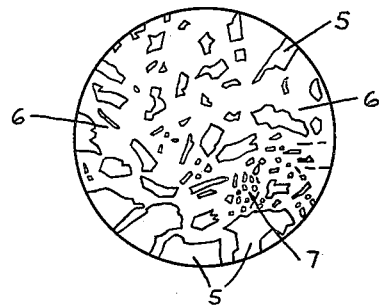
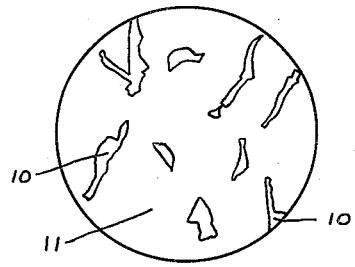
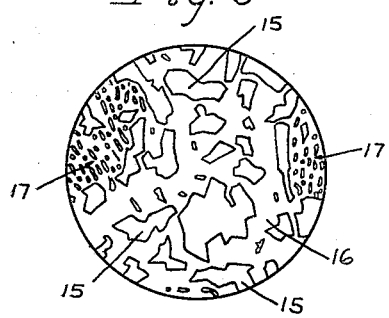
                                        INVENTORS.
                                   JOHN A. BOYER.
                       BY          CARL G. ROSE.
                                        ATTORNEY.

Patented Dec. 17, 1940

2,225,152

UNITED STATES PATENT OFFICE 2,225,152

HARD CARBIDE COMPOSITION

John A. Boyer, Niagara Falls, and Carl G. Rose, Lewiston, N. Y., assignors to The Carborundum Company, Niagara Falls, N. Y., a corporation of Delaware Application February 21, 1938, Serial No. 191,687

8 Claims. (Cl. 106—1)

This invention relates to abrasive or wear-resistant materials composed of hard carbides, and especially to compositions in which difficultly fusible carbides are obtained in crystalline form. The invention further relates to fusion products in which a difficultly fusible carbide has crystallized from a carbide which is more easily fused and especially to fusion products of boron carbide and titanium and/or zirconium carbides.

Although it is well known that titanium and zirconium carbides are extremely hard, prior to our invention they had not been obtained in forms which were practical for use as commercial abrasives.

These hard carbides are ordinarily prepared by reduction, without the carbide passing through the liquid state, and the product is obtained in the form of extremely fine powder. These particles of powder must be sintered together (usually with the addition of one or more metals) in order to obtain a solid mass. This sintering of the individual particles gives a solid mass which has neither the continuity nor the physical properties of a fused crystalline material. On the other hand, fusion of these carbides is attended with extreme difficulty since their melting points approach the temperature of the electric arc and no container is known which will withstand the temperature necessary to produce fusion and which at the same time will not introduce contaminating impurities into the melt. Moreover in attempting to fuse the materials with an electric arc the carbides usually pick up an objectionable excess of carbon from the arc itself.

We have found, however, that mixtures of boron carbide and one or more of the carbides of titanium and zirconium can be readily prepared by reduction of a mixture of the oxides of these elements in a resistance type furnace. We have further found that mixtures of boron carbide and one or more of the carbides of titanium and zirconium can be fused into a homogeneous melt without substantial contamination with impurities and that upon solidification of the melt the titanium and zirconium carbides can be obtained in a form of single crystals rather than as aggregates of sintered particles of powder.

In attempting to reduce an oxide of these elements forming difficultly fusible carbides in a resistance type furnace, the oxide usually does not melt, and with the reaction of the loose powder with carbon the carbide is produced not as appreciably sized crystals but as a very finely divided material. If the oxides are fluxed with boric oxide, however, it is possible to obtain crystals of the respective carbides in conjunction with boron carbide which in itself is not usually an objectionable impurity since boron carbide is also an extremely hard abrasive material.

The nature of the final product obtained will depend to a considerable extent upon the temperature to which the material is heated and upon the composition of the original mix. When furnace charges comparatively high in boric oxide are heated to a high temperature, it is possible to obtain a product which has been completely melted and in which the carbides have crystallized from the fused mix. With lower percentages of boric oxide in the furnace charge or with temperatures somewhat lower than those required to produce complete fusion of the reduced product, products can be obtained in which distinct crystals of the respective difficultly fusible carbides are mixed with boron carbide but in which the mix has not been completely melted.

The size of the crystals produced depends upon the size of the furnace used, and it is possible to obtain crystals in a resistance type furnace which are quite large. Even in a small furnace, however, the crystals are of visible size and are many times the size of the powdered particles of the difficultly fusible carbides in their ordinarily produced state. These crystals can be produced in euhedral form, i. e., well developed so far as crystal faces and edges are concerned.

When the carbide mixtures are prepared in accordance with our invention, the difficultly fusible carbides occur in the mix as individual crystals instead of as agglomerated particles of very fine powder. In products which have been completely fused, these crystals are embedded in a hard, tough matrix which is principally boron carbide. The entire mass is therefore characterized by extreme hardness and the crystalline properties of the difficultly fusible carbide can be utilized for abrasive purposes by breaking the mass into suitably sized granules.

The accompanying drawing shows illustrative examples of the microstructure of products produced in accordance with our invention.

Figure 1 shows the microstructure of a boron carbide-titanium carbide fusion product containing approximately 35 per cent titanium carbide.

Figure 2 shows the microstructure of a boron carbide-zirconium carbide product containing approximately 15 per cent zirconium carbide.

Figure 3 shows the microstructure of a boron carbide-zirconium carbide fusion product containing approximately 45 per cent zirconium carbide.

Referring to the drawing, the structure shown in Figure 1 shows at 5 distinct euhedral crystals of titanium carbide embedded in a matrix 6 which is principally boron carbide. At 7 is shown a crystalline area which has a eutectic structure. In Figure 2, zirconium carbide crystals 10 are shown embedded in a matrix 11 which is principally boron carbide. In Figure 3, 15 designates euhedral crystals of zirconium carbide in a matrix 16, the matrix being principally boron carbide; and 17 designates a crystalline area which has a eutectic structure.

In the absence of thermal curves, it is impossible to state definitely whether the structures shown at 7 and 17 are those of true eutectics or of eutectoids which result from the decomposition of solid phases into two constituents. The two structures, as is well known, are very similar. It is sufficient for descriptive purposes however, to state that the materias have a eutectic structure and it is in this sense that the term is used in this application.

While we have illustrated in the drawing the microstructure of products containing predominant amounts of boron carbide, it is to be noted that our invention is not limited thereto. Compositions containing as little as about 15% of boron carbide intermingled with crystals of the added carbide and fused products containing about 85% boron carbide in which the added carbide has crystallized in a continuous matrix or boron carbide fusion product are examples of compositions within the scope of our invention.

The most practical method of producing the carbide compositions herein described is the simultaneous reduction of the respective oxides with carbon. In carrying out this process the resistance type furnace similar to that ordinarily used in making silicon carbide or boron carbide can be employed. In furnaces of this type, a conducting core of solid carbon is embedded within a loose granular mixture of the respective oxides and carbons.

A mix containing boric oxide when heated in a furnace of this type usually becomes somewhat "pasty" and the gas pressure or vaporization within the mix causes the mixture to swell out or separate from the core so that contamination with carbon is entirely prevented. The core is heated to a temperature sufficiently high to fuse at least a portion of the reduced carbide mixture surrounding it and when the charge is removed from the furnace a layer of fused material is obtained surrounding the cavity formed around the core. The mix used in the furnace charge is approximately in the stoichiometric proportions to give the respective carbides desired in the fusion.

It has been found in the commercial manufacture of boron carbide that the addition of a volatile liquid such as kerosene to the mix used in charging the furnace has a desirable effect upon the operation of the furnace, and such a procedure can of course be employed in the reduction of mixed oxides. The addition of kerosene seems to minimize the bloating of the mix and also facilitates the forming of "cracks" through which gases can escape.

As an alternative method for producing the fused carbide compositions the mixture of oxides and carbon can be heated by means of an overhead carbon resistor, the unfused charge being used as a container for the melt. In the operation of the process in this way, since the fusion temperature of the boron carbide is so low as not to require temperatures at which carbon is very volatile, there is little or no contamination of the product caused by the carbon of the resistor. The charge must, of course, be protected from oxidation during the melting process.

We have found that somewhat denser products may be obtained by crushing the product obtained by either of the above disclosed procedures, and reheating the crushed material with a substantial proportion of a mixture such as used for the original furnace charge.

We have found that extremely careful regulation of the oxide-carbon ratio in the furnace charge is unnecessary in many cases since with a deficiency of carbon it is possible to produce compositions in which borides of the respective elements are present. Since these borides are also extremely hard, the products obtained will also be valuable as abrasive and wear-resistant materials. By suitable regulation it is further possible to obtain compositions in which these borides occur in a boron carbide matrix or in which free boron is present.

When boron carbide is melted in the presence of another oxide, it is possible to obtain melts which have less carbon than the theoretical ratio required to form a product consisting entirely of carbides. As an example, when a charge consisting of 50 per cent silica and 50 per cent boron carbide is heated in the resistance type furnace of the type above described, a fused material is obtained which contains silicon carbide, but does not contain sufficient carbon to allow all of the boron to be present as boron carbide.

It will be obvious that the compositions deficient in carbon will be free from graphite with no tendency toward the granular fracture often caused by the presence of graphite.

Fused boron carbide, as previously produced, even when manufactured under conditions which give a continuous product free from graphite cleavage planes, often contains a small quantity of free graphite, as for example, from one to two per cent. This graphite separates as very thin intergranular graphite flakes, and produces a granular fracture. When a small amount of silicon carbide is added to the boron carbide, this granular structure is eliminated, and the material appears as homogeneous under the microscope. Upon etching, an occasional crystal of silicon carbide can be observed in the boron carbide matrix, but with this exception the material is free from discontinuity.

As has been previously mentioned, products containing boron carbide and a mixture of carbides of titanium and zirconium may be produced in such mixtures by suitably adjusting the proportions of the ingredients produced with comparatively different characteristics can be obtained.

There are a number of other methods by which the fusions above described can be prepared, as for example, by fusion of a mixture of the respective carbides in powdered condition and preferably in briquetted form. In this method the boron carbide, having a comparatively low melting point, serves as a flux for the difficultly fusible carbide or carbides.

All of the fusions herein described can be utilized for the manufacture of molded products by crushing or powdering the fused material, molding it to shape, and heating the molded article to a temperature sufficient to produce either sintering of incipient fusion. Most of the fusions described do not have sharp melting points, but melt over a considerable range of temperatures. When such materials are heated, they usually pass through a more or less pasty or partially fused stage before complete fluidity is reached. This property is of advantage in making self-bonded articles, since with a material which has a definite melting point there is an abrupt change from the solid to the fluid state, the material passing from solid to liquid without a change in temperature when the melting point of the material is reached. With materials of the "alloy" type, where the incipient fusion temperature is below the temperature of complete fusion, the material can be kept in a partially fused condition for an indefinite time without further fusion taking place, and much less accurate temperature control is needed to produce partial or incipient fusion without loss of shape. These carbide compositions are also adapted to sintering or self-bonding under pressure. The powdered prefused or "alloyed" materials, or mixtures of the individual carbides, can also be melted or partially melted under pressure to give dense products characterized by extreme hardness and resistance to wear.

This application is a continuation in part, of our copending application Serial No. 12,588 filed March 23, 1935, now Patent No. 2,108,794, granted February 22, 1938.

Having thus described our invention we claim:

1. As a new article of manufacture a fused carbide composition consisting essentially of boron carbide and a difficultly fusible carbide of the group consisting of titanium and zirconium carbides in which the difficultly fusible carbide is present as a separate crystalline phase which has solidified from a fused mass.

2. As a new manufacture a fused carbide composition consisting essentially of boron carbide and titanium carbide in which the titanium carbide is present as a separate crystalline phase which has solidified from a fused mass.

3. As a new manufacture a fused carbide composition consisting essentially of boron carbide and zirconium carbide in which the zirconium carbide is present as a separate crystalline phase which has solidified from a fused mass.

4. As a new manufacture a fusion of boron carbide and a difficultly fusible carbide of the group consisting of titanium and zirconium carbides in which the difficultly fusible carbide occurs at least in part in the form of microscopic particles distributed throughout a matrix in which boron carbide is the principal constituent.

5. As a new manufacture a composition consisting of boron carbide and a difficultly fusible carbide of the group consisting of titanium and zirconium carbides in which at least a part of the difficultly fusible carbide is crystallized in a form characteristic of a eutectic.

6. As a new manufacture a composition consisting of boron carbide and titanium carbide in which at least a part of the titanium carbide is crystallized in a form which is characteristic of a eutectic.

7. As a new manufacture a composition consisting of boron carbide and zirconium carbide in which at least a part of the zirconium carbide is crystallized in a form which is characteristic of a eutectic.

8. As a new manufacture a fusion of boron carbide and a difficultly fusible carbide of the group consisting of titanium and zirconium carbides in which the difficultly fusible carbide occurs partly in a form characterized by a eutectic structure and partly as distinct crystals, both the eutectic particles and the distinct crystals being distributed throughout a matrix which is essentially boron carbide.

JOHN A. BOYER.
CARL G. ROSE.